(12) United States Patent
Yoshikawa et al.

(10) Patent No.: US 7,201,333 B2
(45) Date of Patent: Apr. 10, 2007

(54) INTERMITTENT AUTOMATIC IRRIGATION SYSTEM

(75) Inventors: Hiroyasu Yoshikawa, Kagawa (JP); Seiji Nakao, Tochigi (JP)

(73) Assignee: Incorporated Administrative Agency, National Agriculture and Bio-oriented Research Organization, Tsukuba-shi (JP)

( * ) Notice: Subject to any disclaimer, the term of this patent is extended or adjusted under 35 U.S.C. 154(b) by 58 days.

(21) Appl. No.: 10/739,121

(22) Filed: Dec. 19, 2003

(65) Prior Publication Data

US 2004/0195372 A1 Oct. 7, 2004

(30) Foreign Application Priority Data

Dec. 25, 2002 (JP) ............................. 2002-374747

(51) Int. Cl.
*B05B 1/14* (2006.01)
(52) U.S. Cl. ............... 239/565; 239/64; 239/69; 239/145; 239/201; 239/310; 239/542; 239/547; 239/562; 47/48.5; 405/36
(58) Field of Classification Search ............... 239/201, 239/203, 207, 67, 69, 145, 303, 310, 318, 239/542, 547, 550, 562, 565, 63, 64; 405/36, 405/51; 47/48.5
See application file for complete search history.

(56) References Cited

U.S. PATENT DOCUMENTS

| | | | | |
|---|---|---|---|---|
| 3,876,146 A | * | 4/1975 | Pacheco | 239/145 |
| 4,315,599 A | * | 2/1982 | Biancardi | 239/565 |
| 4,396,149 A | * | 8/1983 | Hirsch | 239/69 |
| 4,541,563 A | * | 9/1985 | Uetsuhara | 239/64 |
| 5,160,214 A | * | 11/1992 | Sakurai et al. | 405/36 |
| 6,312,191 B1 | * | 11/2001 | Rosenfeld | 239/562 |
| 6,419,422 B1 | * | 7/2002 | Wachtel | 405/36 |

FOREIGN PATENT DOCUMENTS

| | | |
|---|---|---|
| JP | 63-18015 | 2/1988 |
| JP | 10-113082 | 5/1996 |
| JP | 8-238031 | 9/1996 |
| JP | 9-189287 | 7/1997 |

* cited by examiner

*Primary Examiner*—Steven J. Ganey
(74) *Attorney, Agent, or Firm*—Oblon, Spivak, McClelland, Maier & Neustadt, P.C.

(57) ABSTRACT

An automatic irrigation system having a simplified structure can intermittently supply water (and liquid fertilizer) required by farmer products under water saving conditions depending on the weather condition of the day independent of the size of an irrigation area. Water from a water source is pumped by a motor pump driven with electric power generated by a solar panel and stored in a storage tank. When a predetermined amount of water is stored in the tank, a water draining device continuously drains the stored water. This cycle is repeated in proportion to an amount of solar radiation incident on the solar panel. The water is then guided to the irrigation area with a tube irrigation system.

20 Claims, 3 Drawing Sheets

INTERMITTENT AUTOMATIC IRRIGATION SYSTEM

FIELD OF THE INVENTION

The present invention relates to an automatic irrigation system and particularly to an automatic irrigation system suitable for saving of water.

BACKGROUND OF THE INVENTION

As an irrigation method, the inter-ridge irrigation and hose irrigation are performed. In recent years, the droplet irrigation technology has been proposed as a so-called irrigation method for saving of water. In this irrigation technology, amount of water for irrigation per dripping device is restricted to the amount as small as 0.8 L to 3 L/hour via a dripping device provided on a tube or built in the tube in view of performing the uniform irrigation for wider area. This irrigation method has been developed mainly for agricultural irrigation in the drying region, for example, in Israel and may also be used for irrigation of liquid fertilizer by mixing the desired liquid fertilizer to water.

The droplet irrigation technology is the typical irrigation technology for saving of water. However, since the amount of irrigation per dripping device is as small as 0.8 L to 3 L/hour and a dripping device is usually provided in every 20 to 30 cm, the flow rate about 10 L/min. is required for the tube length of 100 m. For the irrigation of 1 ha area, the flow rate of 1000 L/min. is required. When discharge capability of a circulating pump and capability of liquid fertilizer mixing device (having the limit of about 100 L/min.) are considered, irrigation is implemented for every small section using electro-magnetic valves and controllers. Since the pump having higher discharge capability, liquid fertilizer mixing device, electro-magnetic valve and controller having higher capability remarkably raise the cost of the irrigation system as a whole, these elements are spread only to the farmhouses in the scale of enterprises.

Moreover, when the droplet irrigation is performed for a longer period in the amount of irrigation of several liters per dripping device, here rises a problem in the flow of water and liquid fertilizer element because penetration to the deeper area of soil in the gravity direction due to the lateral penetration. Moreover, even when amount of evaporation is rather small in the rainy or cloudy days, since the irrigation instruction which totally relies on the controller is issued, it cannot always be said that irrigation and fertilization are performed depending on the required amount of farm products. Through combination with a rain-fall sensor or a soil water sensor, more accurate control can be realized but the cost further rises.

As the other profile of the irrigation technology for saving of water, a irrigation fertilization system has been proposed in which flow of water and liquid fertilizer into the deep area of soil is remarkably reduced by repeatedly performing intermittent irrigation in a small amount during a day and then effectively irrigation the liquid fertilizer only to the upper layer portion of the soil (region where group of roots of farmer products is distributed) (refer to the patent document 1 (WO98/54953). This system is provided with a plurality of local subsystems and each local subsystem is controlled with the remote control operation. Each local subsystem comprises a storage tank of the capacity to store at least the water (and liquid fertilizer) in the amount discharged during one cycle, a irrigation device for receiving a signal from the controller to control the amount of water to be irrigated and to discharge the controlled amount of water, an electronic controller to determine the frequency and time of discharging, and a tube irrigation system to guide the water to the irrigation place.

Water is supplied to the storage tank with a pump. When the storage tank is filled with water, supply of water is stopped and the tube irrigation is conducted to the wider area by opening and closing the electro-magnetic valve at the previously programmed day and time. The electric power for turning ON and OFF the control signal and opening and closing the electro-magnetic value depends on the power supplied from a solar panel to form the ecological irrigation facility. Moreover, the venturi system may be introduced for the liquid fertilizer in which concentrated liquid fertilizer can be extracted and reduced by utilizing pressure difference of water flow.

Moreover, as an automatic irrigation system utilizing the power source from the solar panel, the patent document 2 (Japanese Published Unexamined Patent Application No. 238031/1996) describes the irrigation system in which a solar battery array is installed to receive the solar beam only at the predetermined time in a day, irrigation water is pumped up from a reserving tank and is then irrigated to the green area through a irrigation hose with a DC brushless motor pump which is driven in direct with the DC output from the solar battery array. According to this automatic irrigation system, automatic irrigation at the predetermined time in a day can be realized without any complicated setting of timer.

[Patent document 1]

WO98/54953

[Patent document 2]

Japanese Unexamined Patent Publication No. 238031/1996

The droplet irrigation facility described provides various merits as the irrigation technology for saving water. However, many expensive sensors and electro-magnetic valves or control mechanisms are required to implement effective irrigation and fertilization suitable for farmer products. Moreover, a liquid fertilizer mixing device which can realize delicate control is required to mix the adequate amount of liquid fertilizer. Even in the irrigation and fertilizing system described in the patent document 1 (WO98/54953), the water stored in the storage tank can be irrigated to the wider area with the tube irrigation method through the opening and closing of the electro-magnetic valve at the programmed day and time. Therefore, in order to attain the optimum irrigation and fertilizing environment for the farmer products, high level control system is required for controlling the opening/closing timing and time of the electro-magnetic valve, resulting in rise of cost. In addition, the venturi system is employed for the liquid fertilizer to extract and reduce the concentrated liquid fertilizer by utilizing pressure difference of water flow, but it is difficult for this venturi system to obtain higher accuracy.

In the automatic irrigation system described in the patent document 2 (Japanese Published Unexamined Patent Application No. 238031/1996), the irrigation water stored in the reserving tank is pumped up for irrigation by utilizing a DC brushless motor pump which is driven in direct with a DC output generated by a solar battery array in order to realize automatic irrigation at the constant times. However, a complicated mechanism is required to install the solar battery array to receive the solar beam only at the constant times in a day. Moreover, any consideration is not taken for setting of the optimum irrigation and fertilizing environment suitable for farmer products depending on the weather condition of the day.

SUMMARY OF THE INVENTION

The present invention has been proposed considering the background situation described above. It is therefore an object of the present invention to provide an automatic irrigation system which can supply water required for farmer products under the water-saving condition depending on the weather condition of the day (amount of solar beam in a day) without relation to the irrigation area and without use of complicated control mechanism for control of electro-magnetic valve and motor for adjusting the amount of irrigation water and intermitting the irrigation operation and the mechanism or the like for controlling amount of received solar beam of the solar panel. Moreover, another object of the present invention is to provide an automatic irrigation system which can supply the liquid fertilizer in the amount required by farmer products together with water using a simplified mechanism.

The automatic irrigation system of the present invention comprises a motor pump driven directly with the electric power generated by a solar panel, a reserving tank for storing water pumped with the motor pump from the water source, a water draining means for starting drainage of water when the predetermined amount of water is stored in the reserving tank and continuously draining completely the stored water, and a tube irrigation system for guiding the water drained with the draining means to the irrigation area.

In the automatic irrigation system of the present invention, the irrigation water is pumped up (supply to the reserving tank) from the water source (channel for irrigation or pond or marsh) only with a motor pump which is driven directly with the electric power generated by a solar panel. The structure is very simplified. Since the electric power entirely depends only on the solar panel, amount of water supply depending on the amount of solar beam in a day can surely be realized. Farmer products require a large amount of water because a large amount of water is vaporized when the amount of solar beam in a day is larger and almost do not require the irrigation in a rainy day and in the night. Excessive irrigation is rather harmful for growth of farmer products. Namely, the amount of water required for farmer products is substantially proportional to the amount of solar beam in a day. According to the present invention, the sufficient irrigation required (proportional to the amount of solar beam in a day) for farmer products can be easily realized without use of a particular controller.

In the automatic irrigation system of the present invention, the irrigation water pumped up with the motor pump is once stored in the reserving tank. When the predetermined amount of water is stored in the reserving tank, the water stored is completely drained continuously with an adequate water draining means to complete one cycle. The water drained during one cycle is guided as the irrigation water to the irrigation area via the adequate tube irrigation system.

So long as the solar panel continuously generates, from the solar beam, the electric power of the lowest limit which can drive at least the motor pump, supply of water to the reserving tank can be continued even during water drainage. Amount of water drained from the reserving tank per unit time is large proportional to the amount of water supplied from the motor pump and when one cycle of water drainage is completed, storage of water to the reserving tank of the next cycle starts. In this timing, drainage of water stops due to the operation of the water draining means. So long as the solar beam required for this cycle is received, this cycle is performed repeatedly. Namely, the irrigation which is proportional to the amount of solar beam in a day is easily and surely executed without use of particular control mechanism and electro-magnetic valve or the like. Since amount of water for irrigation is restricted only with the capacity of reserving tank, it is no longer required to provide a means for restricting flow rate to the tube irrigation system and the total structure of the system can be simplified.

Capacity of the reserving tank can be determined as required depending on the area required for irrigation but the optimum intermittent irrigation condition can be easily ensured depending on the irrigation place or farmer products only by setting the capacity of reserving tank and capacity of motor pump (amount of water supplied).

An amount of water pumped with the motor pump varies depending on an amount of solar beam in a day. Therefore, the number of times of irrigation during a day becomes larger when an amount of solar beam in a day is larger, namely when an amount of vaporized water becomes larger. Meanwhile, when the amount of solar beam in a day is rather small, interval of irrigation becomes longer and the total amount of irrigated water is suppressed. In the rainy day or in the night, the irrigation is stopped without use of particular controller. Namely, according to the present invention, the required irrigation may be realized only when the farmer products require as described above.

As described above, in the automatic irrigation system of the present invention, water is supplied at a lower flow rate to the reserving tank of the capacity depending on the irrigation area and when supply of water in a predetermined amount is completed, water is distributed simultaneously to the tube irrigation systems. Therefore, the irrigation to comparatively wider area can be realized only with the water flow of small flow rate from the water source or small scale well which is restricted in an amount of water supply. Accordingly, irrigation for saving water can be realized, without any complicated controlling means required for large scale irrigation in the existing irrigation technology for saving water, for wider area and the same device may also be used effectively for indoor observation gardening and kitchen garden or the like only with individual allocation of a plurality of devices.

In the automatic irrigation system of the present invention, there is no particular restriction in the tube irrigation system used and well known systems may be used as required. The tube provided with the well known dripping device may also be used. In any case, since vertical penetration in the gravity direction of water (and liquid fertilizer elements) is suppressed and only the lateral penetration is accelerated by a small amount of irrigation (fertilizing) in many times, the water (liquid fertilizer) distribution characteristic per water discharge port in the tube irrigation can be improved, namely water is irrigated widely to the shallow area from the ground surface (part within 30 cm from the ground surface) to realize the fertilizing by the irrigation for wider area with a small number of discharge ports. Thereby, flow of water (and liquid fertilizer element) from the soil layer can be suppressed.

Since the effective root group region (target region) which is rich in the vapor phase and is suitable for growth of root is effectively irrigated as a result, farmer products are freed from drying stress and crop can be raised. Particularly, remarkable increase of crop can be expected in the drying region. Moreover, since the irrigation region is limited only to the shallow area from the ground surface, it is possible to obtain the merit that quality control becomes easier.

In addition, as described above, flow rate of the irrigation per minute is required for several tens of litters to several hundreds of liters in the ordinary droplet irrigation. However, in the automatic irrigation system of the present invention, flow rate in the water distribution can be improved even if the flow rate of supplied water is rather low by utilizing time difference between water supply and water distribution. In general, even when flow rate of supplied water from the water source as the restriction factor of irrigation rate is rather low, the irrigation of wider area can be realized. For example, when the time required until the reserving tank becomes full is set to an hour, an amount of water required for single irrigation per 10 a becomes 300 L to 500 L and therefore simultaneous irrigation may be realized with an amount of water of 10 L or less per minute. If it is attempted to realize such irrigation with the traditional droplet irrigation method, divided irrigations with 10 electro-magnetic valves are required. As described above, the automatic irrigation system of the present invention can realize the irrigation for wider area with the supply of water of a small amount of water from a creek without requirement of large capacity water supply system with a pipeline from a large size dam which can store a large amount of water.

The automatic irrigation system of the present invention can be further provided with a liquid fertilizer mixing device to mix the liquid fertilizer to the water stored in the reserving tank. According to this profile of the present invention, the fertilizing with the intermittent water-saving irrigation may be implemented. In this case, the desired liquid fertilizer mixing device may be used but it is more effective to use a device wherein the partitioned liquid fertilizer chamber and water chamber are provided, a part of the water pumped with the motor pump is distributed into the water chamber, and the liquid fertilizer of the amount proportional to the distributed water is drained from the liquid fertilizer chamber and is then applied to the reserving tank.

With use of the liquid fertilizer mixing device of the structure described above, the liquid fertilizer reduced accurately in the higher reduction factor can be supplied to the farmer products in the required amount whenever it is required. In this case, since the concentrated liquid fertilizer is mixed with the supplied water in the reserving tank being balanced with the atmospheric pressure, it is no longer required to generate pressure difference which has been required for the existing piston type liquid fertilizer mixing device and suction type liquid fertilizer mixing device using the venturi tube and the liquid fertilizer of the higher reduction factor can be adjusted effectively with the simplified structure.

DETAILED DESCRIPTION OF THE INVENTION

Figure 1:
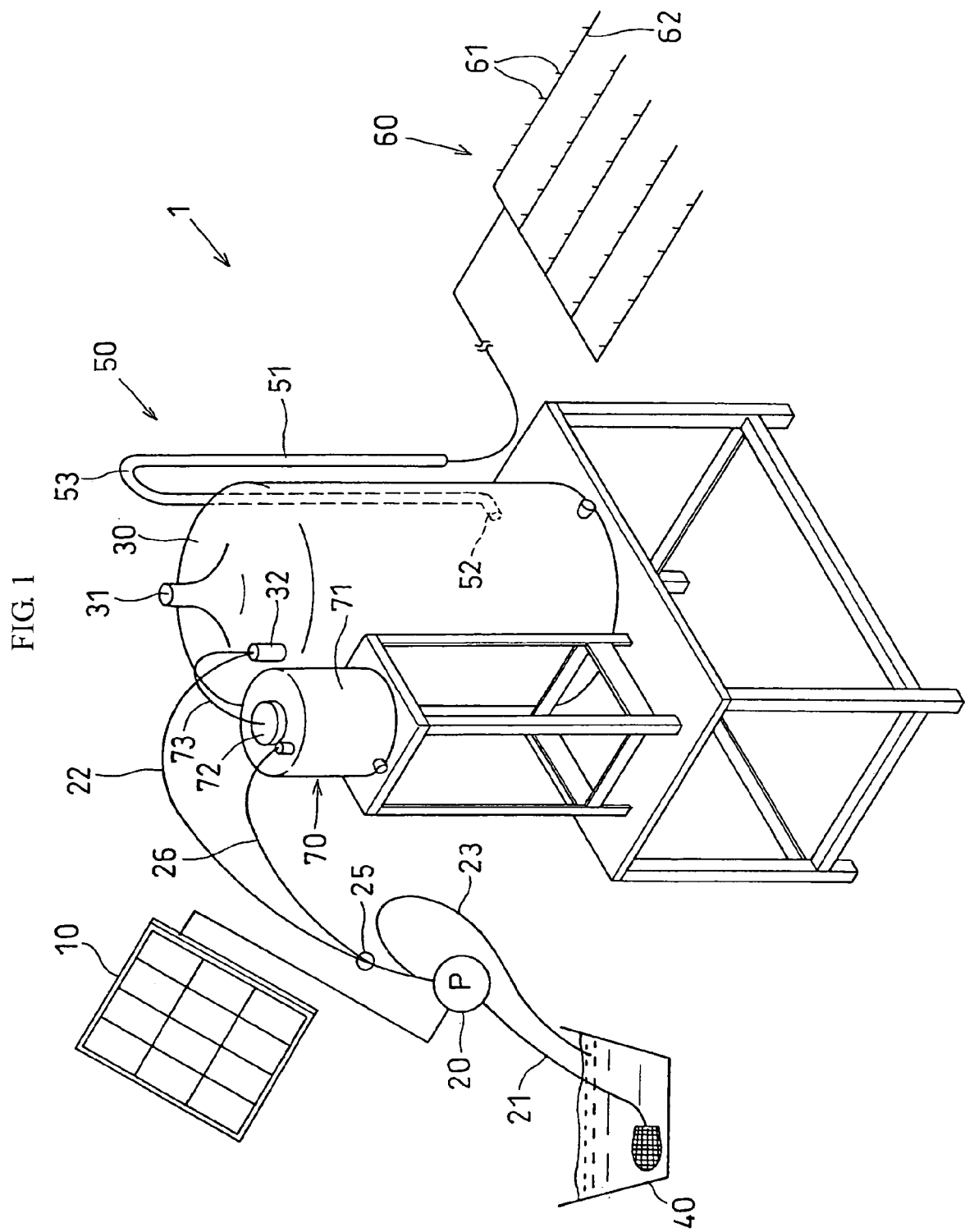
FIG. 1 is a schematic diagram illustrating the entire part of an automatic irrigation system of the present invention.
Figure 2:
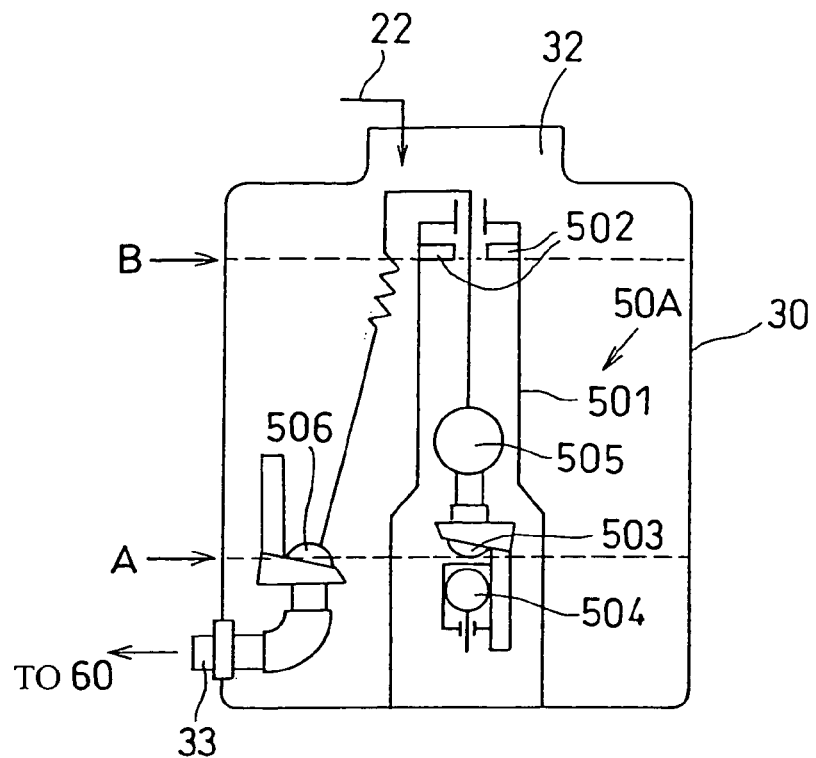
FIG. 2 is a diagram illustrating another example of a water draining means used for the automatic irrigation system of the present invention.

An embodiment of an automatic irrigation system of the present invention will be described below with reference to the accompanying drawings. FIG. 1 is a schematic diagram illustrating the entire part of the automatic irrigation system. FIG. 2 is a schematic diagram illustrating a liquid fertilizer mixing device used in this embodiment. The automatic irrigation system 1 is basically composed of a motor pump 20 to be driven directly with the electric power generated by a solar panel 10 and a reserving tank 30 for storing water pumped up from the water source with the motor pump 20.

The solar panel 10 is formed as the well known panel wherein a plurality of solar battery arrays are connected serially and this panel is enough when it can output the electric power to drive the motor pump 20 used. Any type of motor pump 20 may also be used so long as it can be driven with a DC current generated by the solar panel 10. An axial pump is more preferable but the other type pump may also be used. The suction side of the motor pump 20 is adequately connected to a water source 40 via a hose 21. In the automatic irrigation system 1 of the present invention, the water source 40 may be a creek which can supply a small amount of water as described above.

The reserving tank 30 used is of the open type having an aperture 31 to the atmospheric pressure at the ceiling surface thereof and the ceiling surface is also provided with a hose guiding port 32. The other end of the hose 22 connected in the discharge port side of the motor pump 20 is connected to the hose guiding port 32. Therefore, under the condition that the solar panel 10 is irradiated with the solar beam to generate the electric power enough to drive the motor pump 20, the water in the water source 40 is pumped up with operation of the motor pump 20 and is stored in the reserving tank 30 via the hose 22. In the rainy day and the night (namely, when farmer products do not require the supply of water), the motor pump 20 does not operate and the pumping is stopped.

The reserving tank 30 is provided with a water draining means 50 which starts drainage of water when a predetermined amount of water is stored in the reserving tank 30 and continuously drains the stored water. The desired water draining means 50 may be used but the predetermined drainage is performed, in this embodiment, based on the principle of siphon using an inversed U-shape pipe 51. One end 52 of the inversed U-shape pipe 51 is allocated at the area near to the bottom of the reserving tank 30, the pipe 51 rises up to the predetermined height area, and it is then turned to the lower side with the predetermined height area defined as the top area 53. When the level of the water supplied into the reserving tank 30 reaches the top area 53 of the inversed U-shape pipe 51 with operation of the motor pump 20, drainage of water starts via the inversed U-shape pipe 51 based on the principle of siphon and stored water is continuously drained completely. The start timing of drainage (namely, the maximum amount of stored water in the reserving tank 30) can be varied easily by properly adjusting the level of the predetermined height area 53 of the inversed U-shape pipe 51. When the motor pump 20 operates continuously even after completion of water drainage, supply of water to the reserving tank 30 is continued and water drainage is started as described above when the amount of water reaches again a predetermined amount. Since this cycle is repeated depending on an amount of solar beam in a day, the total amount of water drained from the reserving tank 30 is proportional to the amount of solar beam in a day (hours).

The discharge side of the inversed U-shape pipe 51 is connected to the tube irrigation system 60 to guide the water drained from the reserving tank 30 to the irrigation area. The tube irrigation system 60 may be identical to the existing irrigation facility and the diameter 62 of tube and size of the irrigation port 61 are set to attain an adequate amount of irrigation from the irrigation port 61. In some cases, it is also possible to provide the conventional dripping device to the tube. The water draining means 50 using the inverted U-shape pipe 51 is only an example and the desired means may be used, for example, the water draining means utilizing the inverted U-shape pipe 51 illustrated in FIG. 2 and the means consisting of adequate level sensor and valve illustrated in FIG. 3, or the like.

In FIG. 2, the reserving tank 30 is provided with a hose guiding port 32 which is the hole for introducing the water pumped up with operation of the motor pump 20 and a draining port 33. This draining port 33 is connected to the tube irrigation system 60. The reserving tank 30 is provided, at its internal side, with a water draining means 50A. This water draining means 50A includes a main float chamber 501 and a water guiding hole 502 is formed to the area near the upper end portion of the main float chamber 501. In the lower area of the main float chamber 501, a first float valve 503 is provided and it moves upward to close the main float chamber 501 when a second float valve 504 located at the lower part of the first float valve 503 floats up to the surface. A third float valve 505 is located at the upper part of the first float valve 503 and the third float valve 505 is connected to a fourth float valve 506 to open and close the exhaust port 33 via a link under the condition that the operation is interlocked. The fourth float valve 506 and the first float valve 503 are allocated almost in the same level.

While the reserving tank 30 is vacant, water is gradually supplied into the tank from the hose 33. The water supplied lifts up the second float valve 504. When the second float valve 504 reaches the level of line A, the first float valve 503 is lifted up with the second float valve 504 to close the main float chamber 501. Supply of water is continued and the water surface level in the reserving tank 30 gradually rises. When the water surface level reaches the line B, water starts to enter the main float chamber 501 from the guiding hole 502. The third float valve 505 is lifted up with buoyancy of the water entering the main float chamber 501 and the fourth float valve 506 moves in the opening direction interlocking with the movement of the third float valve 505. When the fourth float valve 506 opens, water in the reserving tank 30 is drained to the tube irrigation system 60 from the draining port 33. When the water surface level drops up to the line A because of drainage, the fourth float valve 506 moves downward to close the draining port 33. In this timing, the first float valve 503 moves downward to open the main float chamber 501. Accordingly, water in the main float chamber 501 is also drained to set up the initial condition. Thereafter, this operation cycle is repeated so long as the entry of water from the hose 22 is continued.

Figure 3:
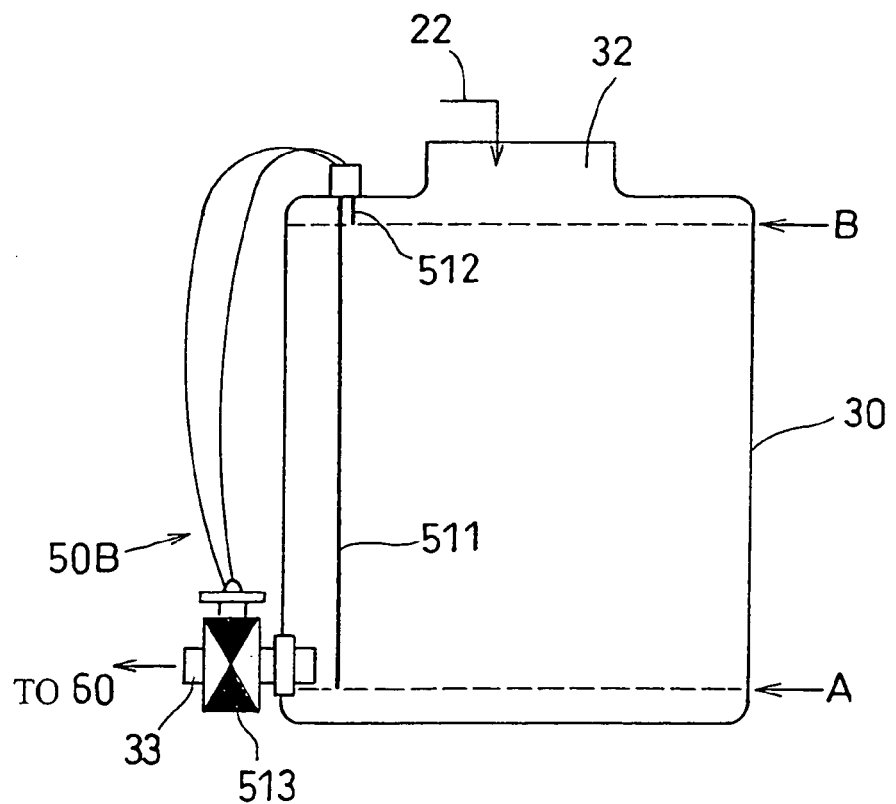
FIG. 3 is a diagram illustrating the other example of the water draining means used for the automatic irrigation system of the present invention.

FIG. 3 illustrates the reserving tank 30 provided with a water draining means 50B consisting of an adequate level sensor and a valve. The reserving tank 30 is provided with a first level sensor 511 to detect the level A as the lower water surface level and a second level sensor 512 to detect the level B as the upper water surface level and the water draining port 33 is provided with an electromagnetic valve 513 to open and close by receiving a signal from the level sensor. When the water level drops to the level A because the water is drained to the tube irrigation system 60, it is detected with the first level sensor 511 to generate a signal and the electromagnetic valve 513 closes the draining port 33 by receiving such signal. Water is continuously supplied from the hose 22. When the water surface level reaches the level B, it is detected with the second level sensor 512 to generate a signal and the electromagnetic valve 513 opens the draining port 33 by receiving such signal. Accordingly, drainage of water to the tube irrigation system 60 is started again, the water surface level drops up to the level A causing the electromagnetic valve 513 to close, and thereby reserving of water starts. Subsequently, this cycle is repeated so long as the supply of water from the hose 22 is continued. In this embodiment, an electrode rod is used as the level sensor, but a float type sensor may also be used as the second level sensor 512 to detect the level B as the upper water surface level.

As described above, the automatic irrigation system 1 of the present invention can restrict an amount of water to be irrigated with the single irrigation operation in the side of the reserving tank 30 and moreover can repeat the irrigation with the predetermined interval without use of a complicated controller or an electromagnetic valve, etc. Thereby, the optimum intermittent irrigation condition for saving water may be realized depending on the irrigation area and farmer products. Moreover, vertical penetration of water in the gravity direction can be suppressed through the frequent irrigation in small amount of water and the water distribution characteristic per water discharge port in the tube irrigation can also be improved. Accordingly, as described above, the area within 30 cm from the ground surface, for example, can be irrigated widely. Moreover, the fertilizing with the irrigation in the wider area can be realized with small number of water discharge ports and flow of water (and liquid fertilizer element) from the soil layer can be suppressed.

Moreover, the motor pump 20 is driven depending only on the electric power from the solar panel 10 and an amount of water pumped up with the motor pump 20 varies, as described above, depending on an amount of solar beam in a day. Therefore, the number of times of irrigation in a day increases as an amount of solar beam in a day is larger, namely as an amount of evaporation becomes larger. When an amount of solar beam in a day is small, the interval of irrigation becomes longer and an amount of water irrigated also becomes small. As a result, the necessary irrigation required by the farmer products can surely be realized.

In some cases, it is also probable, due to the relationship between the capacity of reserving tank 30 and an amount of water fed by the motor pump 20, that the number of times of irrigation exceeds the required number of times and the water and liquid fertilizer element from the soil layer flow out. In view of avoiding such event, it is also possible that a circulating hose 23 is branched from the hose 22 in the discharge side of the motor pump 20 and thereby the excessive water is circulated to the water source side. In this case, although not illustrated, a reducing valve and an adequate pressure gauge may be allocated in the downstream direction of water flow to properly set an amount of circulated water.

The automatic irrigation system 1 of the present invention is preferably provided with the liquid fertilizer mixing device to mix the liquid fertilizer into the stored water in the reserving tank 30. Accordingly, the intermittent fertilizing with water irrigation may be realized easily. Although not restricted particularly, it is effective to use the liquid fertilizer mixing devices 70, 70A in the profiles illustrated in FIG. 4A and FIG. 4B as the liquid fertilizer mixing device.

Figure 4:
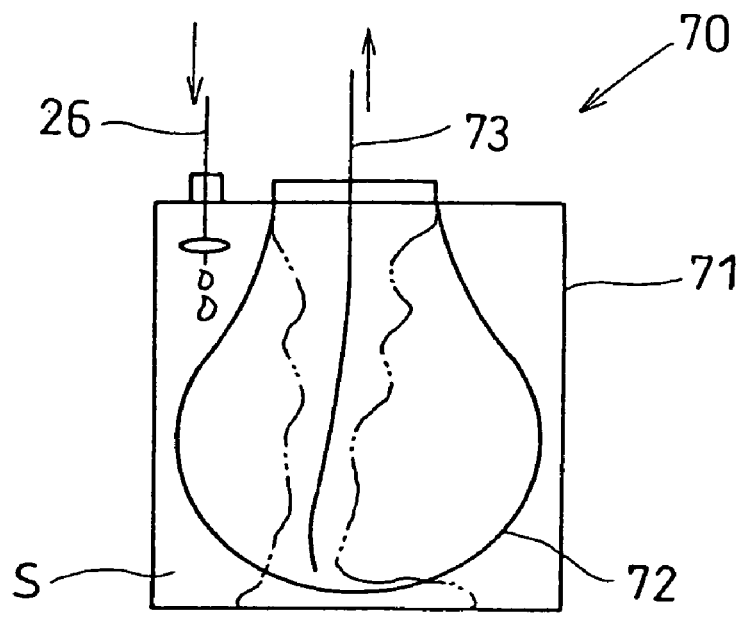
FIGS. 4A and 4B are schematic diagrams illustrating examples of a liquid fertilizer mixing device used for the automatic irrigation system of the present invention.
Figure 4:
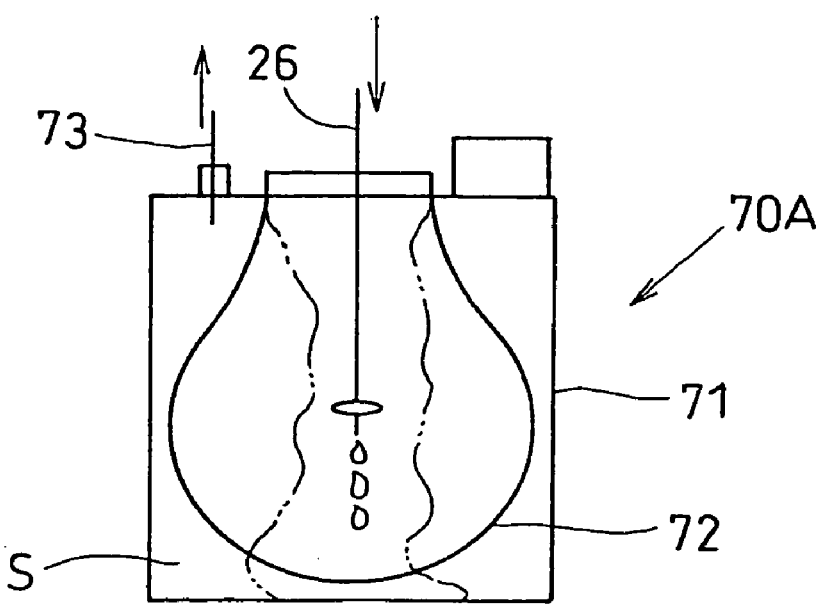

The liquid fertilizer mixing device 70 illustrated in FIG. 4A is provided with an external vessel 71 and an interval vessel 72. The external vessel 71 is a rigid vessel but the internal vessel 72 is made of a flexible sheet (for example, a resin sheet). The volumes of these vessels may be varied. The internal vessel 72 is designed as a liquid fertilizer chamber and is filled with the concentrated liquid fertilizer. A space S between the external vessel 71 and interval vessel 72 is designed as a water chamber and is filled with water. The other end of the hose 73 inserted into the internal vessel 72 enters the hose guiding port 32 formed at the ceiling surface of the reserving tank 30 described above. Meanwhile, a branching hose 26 is branched, via a flow rate adjusting valve 25, from the hose 22 and the front end thereof is opened to the space S between the external vessel 71 and internal vessel 72.

In the structure described above, the internal vessel 72 is filled with the concentrated liquid fertilizer, while the space S between the external vessel 71 and interval vessel 72 is filled with water. When a part of the irrigation water flowing in the hose 22 is branched to the distribution hose 26, the distributed water enters the space S. Accordingly, the internal vessel 72 is contacted as much as the equal volume and thereby the concentrated liquid fertilizer as much as contraction enters the reserving tank 30 via the hose 73. Thereby, the water in the reserving tank 30 becomes the irrigation water including an adequate amount of liquid fertilizer. The concentrated liquid fertilizer in the amount proportional to the flow rate of the irrigation water is fed to the reserving tank 30 by setting the flow rate adjusting valve 25 to branch the water in the amount proportional to the flow rate of the hose 22 to the branching hose 26. Accordingly, the irrigation water including the liquid fertilizer of almost constant concentration can always be fed to the tube irrigation system 60.

The liquid fertilizer mixing device 70A illustrated in FIG. 4B is configured identical to the device of FIG. 4A but is different from the liquid fertilizer mixing device 70 in the point that the release end of the branching hose 26 is opened to the internal vessel 72, the internal vessel 72 is formed as the water chamber, the space S between the external vessel 71 and the internal vessel 72 is formed as the liquid fertilizer chamber filled with the concentrated liquid fertilizer, and the other end of the hose 73 inserted thereto enters the hose guiding port 32 formed at the ceiling surface of the reserving tank 30. Such profile results in the merit that the concentrated liquid fertilizer can be easily supplemented.

With use of the liquid fertilizer mixing devices 70, 70A of the structure described above, the required amount of liquid fertilizer which is accurately reduced in the higher reduction factor can be supplied to the farmer products whenever it is required. In this case, since the concentrated liquid fertilizer is mixed with water in the reserving tank 30 which is balanced to the atmospheric pressure, a pressure difference which has been required, as described above, for the existing piston type liquid fertilizer mixing device and the suction type liquid fertilizer mixing device using the venturi pipe is no longer required and reduction of the liquid fertilizer can be adjusted effectively in the higher reduction factor through the simplified structure.

As described above, the automatic irrigation system of the present invention can be applied to every profiles such as gardening for indoor observation, kitchen garden (10 a or less), small scale farmer (10 a to 2 ha) and large scale farmer (2 ha or more) by properly setting the capacity of reserving tank 30. Moreover, the present invention can also be applied even for facility gardening such as indoor cultivation. The required capacity of reserving tank is about 5 L to 10 L for the gardening of indoor observation, 100 L to 300 L for the kitchen garden, 300 L to 5 t for small scale farmer, 5 t×ha for large scale farmer. It is also possible to simultaneously use a plurality of automatic irrigation systems in the same irrigation area.

As described above, the automatic irrigation system of the present invention can intermittently supply, although simply constituted, the water (and liquid fertilizer) for saving water required by the farmer products depending on the weather condition of the day (an amount of solar beam in a day) without relation to the irrigation area.

What is claimed is:

1. An automatic irrigation system, comprising:
   a motor pump configured to be driven directly by electric power generated by a solar panel;
   a tank configured to store water pumped from a water source by said motor pump;
   draining means for continuously draining a predetermined amount of water from the tank, said draining means starting the draining of the water when the water reaches a predetermined level in the tank; and
   a tube irrigation system configured to guide the water drained by said draining means to an irrigation area.

2. The automatic irrigation system according to claim 1, further comprising:
   a mixing device configured to mix a liquid fertilizer to the water stored in the tank.

3. The automatic irrigation system according to claim 2, wherein the mixing device comprises a fertilizer chamber and a water chamber, wherein a portion of the water pumped by the motor pump is branched to the water chamber, and an amount of liquid fertilizer proportional to the water supplied is drained from the liquid fertilizer chamber into the tank.

4. The automatic irrigation system according to claim 1, wherein an amount of water drained by said draining means to the irrigation area is proportional to an amount of solar radiation incident on the solar panel.

5. The automatic irrigation system according to claim 1, wherein water from the water source is pumped by the motor pump into the tank while the tank is being drained by the draining means.

6. The automatic irrigation system according to claim 1, wherein water from the water source is continuously pumped by the motor pump into the tank as long as a sufficient amount of solar radiation reaches the solar panel.

7. The automatic irrigation system according to claim 1, wherein a refill cycle of the tank automatically starts once the tank is emptied by the draining means.

8. The automatic irrigation system according to claim 1, wherein an amount of water delivered to the irrigation area is controlled by a size of the tank.

9. The automatic irrigation system according to claim 1, wherein the draining means comprises an inverse U-shape pipe.

10. The automatic irrigation system according to claim 9, wherein a maximum amount of water stored in the tank is varied by adjusting the level of a highest point of the inverse U-shape pipe with respect to the tank.

11. The automatic irrigation system according to claim 1, further comprising:
    a dripping device connected to the tube irrigation system.

12. The automatic irrigation system according to claim 1, further comprising:

means for mixing a fertilizer with the water stored in the tank.

13. The automatic irrigation system according to claim 1, wherein the motor pump has a capacity set at least based on at least one of the irrigation area and a farm product.

14. An automatic irrigation system, comprising:
a solar panel;
a motor pump configured to pump water from a water source as directly driven by electricity generated by the solar panel;
a tank configured to store the water pumped by the motor pump;
a draining device configured to start draining a predetermined amount of water continuously from the tank when the water reaches a predetermined level in the tank; and
a tube irrigation system configured to guide the predetermined amount of water drained by the draining device to an irrigation area.

15. The automatic irrigation system according to claim 14, wherein the motor pump has a capacity set at least based on at least one of the irrigation area and a farm product.

16. The automatic irrigation system according to claim 14, further comprising a mixing device configured to mix a liquid fertilizer to the water stored in the tank.

17. The automatic irrigation system according to claim 14, wherein the draining device comprises an inverse U-shape pipe.

18. The automatic irrigation system according to claim 17, wherein a maximum amount of water stored in the tank is varied by adjusting the level of a highest point of the inverse U-shape pipe with respect to the tank.

19. The automatic irrigation system according to claim 17, wherein the predetermined level of the water in the tank is varied by adjusting the level of a highest point of the inverse U-shape pipe with respect to the tank.

20. The automatic irrigation system according to claim 14, further comprising a hose connecting the motor pump and the tank and a circulating hose branched from the hose to circulate an excessive water to the water source.

* * * * *